(No Model.)

G. W. JOHNSON.
SEED SOWING ATTACHMENT FOR PLOWS.

No. 521,542. Patented June 19, 1894.

Witnesses

Inventor
George W. Johnson.

By John W. Edderburn
his Attorney

UNITED STATES PATENT OFFICE.

GEORGE W. JOHNSON, OF FLORESVILLE, TEXAS.

SEED-SOWING ATTACHMENT FOR PLOWS.

SPECIFICATION forming part of Letters Patent No. 521,542, dated June 19, 1894.

Application filed September 22, 1893. Serial No. 486,193. (No model.)

*To all whom it may concern:*

Be it known that I, GEORGE W. JOHNSON, a citizen of the United States, and a resident of Floresville, in the county of Wilson and State of Texas, have invented certain new and useful Improvements in Seed-Sowing Attachments for Plows; and I do hereby declare the following to be a full, clear, and exact description of the invention, such as will enable others skilled in the art to which it appertains to make and use the same.

This invention relates to seed-sowing attachments for plows, and has for its object to provide a device which is adapted to drop the seed in a furrow as it is made by the plow, and after it is covered by the formation of a successive furrow, and thereby complete the sowing or drilling process simultaneously with the plowing operation.

With these and other objects in view, the invention consists of the construction and arrangement of the several parts which will be more fully hereinafter described and claimed.

Figure 1:
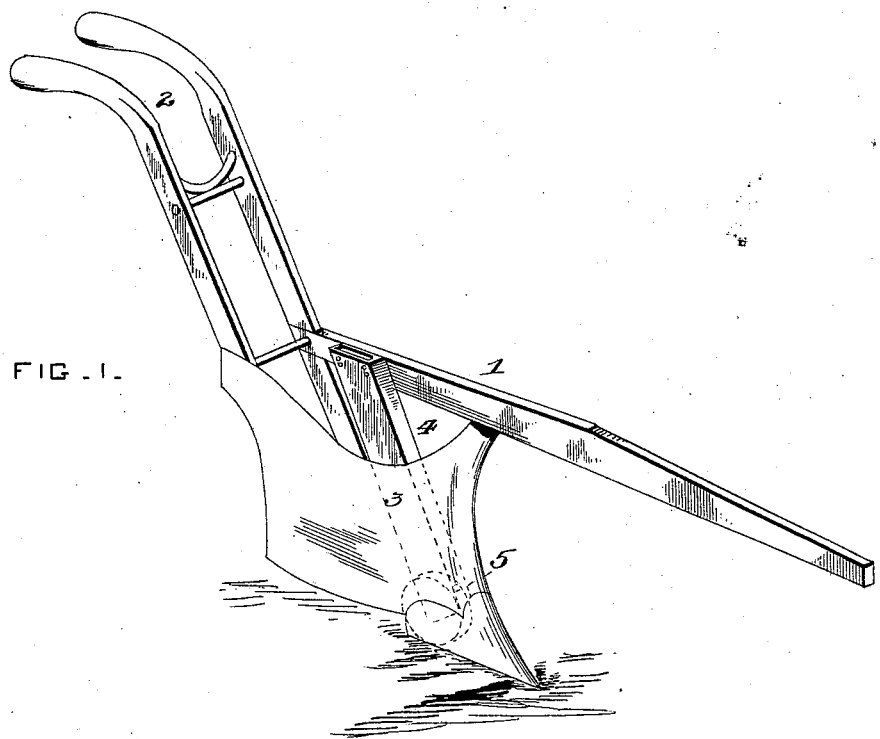
Figure 2:
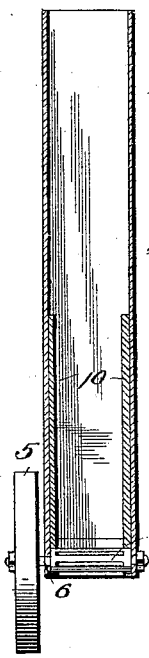
Figure 3:
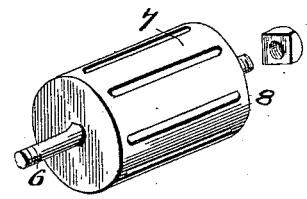
Figure 4:
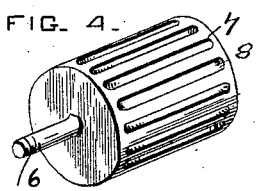
Figure 5:
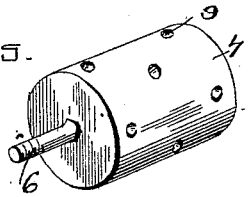

In the drawings: Figure 1 is a perspective view of a plow, showing the improved device applied thereto. Fig. 2 is a transverse central vertical section of the attachment. Fig. 3 is a detail perspective view of the roller. Fig. 4 is a similar view of a modified form of roller as shown which is adapted for sowing peas or beans. Fig. 5 is a similar view of another form of roller adapted for sowing corn.

Similar numerals of reference are employed to indicate corresponding parts in the several views.

Referring to the drawings, the numeral 1 designates the plow-beam having handles 2 and a plow-share 3 with any preferred form of landside, mold, and point.

Secured to the beam 1 is a square box 4 of elongated form having at the bottom thereof a bearing, operating or friction wheel 5, which runs on the outside of the box and having a spindle or axle 6 which extends through the lower part of the box. On the said axle or spindle is immovably mounted a fluted roller 7, the exact length of the inside of the box—it revolves or turns through the operation of the friction wheel, the latter being located in rear of the point and a little below the beam of the plow so as to throw sufficient weight upon the said wheel to cause it to turn or revolve as the plow goes forward pulled by the team. The fluted roller 7 is revolved or turned as the friction wheel revolves, to expose said fluted roller to the grain which is placed in the box 4, and as the friction wheel turns, drops or drills the grain into the bottom of the furrow, and as the plow comes around in plowing the land in the usual manner, it covers the grain so drilled and at the same time opens and sows or drills another furrow and so on successively.

To make the fluted roller removable, and to cause it to turn with the friction wheel, the axle or spindle of the said friction wheel is made angular in part or other mechanical equivalent, and secured at one end by a removable nut or analogous attaching means as shown, whereby the said fluted roller can be taken out and substituted by that shown in Fig. 4, or the one illustrated by Fig. 5.

The roller shown in Fig. 4 is adapted for sowing turnip seeds and the flutes 8 are made very shallow while for sowing grain, peas or beans, holes are simply drilled in the roller instead of making flutes as at 9 in Fig. 5, the said holes being of such dimension as to suit the size of the beans or peas.

For drilling corn, the same construction is employed as in Fig. 5, with the exception that only one or two holes are used in the center of the roller, which are of sufficient depth to hold one or two grains of corn. The roller will be changed still further to adapt the same for sowing cotton-seed and other kinds of seed, and the device may be attached to any form of plow now in use, and is adapted to sow other materials aside from those stated.

On the inside of the box 4 are fitted slide boards 10, which are adapted to hold the seed in the fluted roller and thereby insure an accurate and positive feed and prevent the seed from escaping over the opposite end of the said roller.

It is obviously apparent that many minor changes in the construction and arrangement of the several parts might be made and substituted for those shown and described so long as they are within the scope of the invention.

Having thus described the invention, what is claimed as new is—

In combination with a plow, of a seed box attached to the beam in rear of the plow point, a bearing and operating wheel having a spindle or axle extending through the lower portion of the said seed box, a feeding roller mounted in said box and on the said spindle or axle of the operating wheel, and sliding boards within the box, to direct the seed to the feeding roller and prevent lateral escape of the seed, substantially as described.

In testimony whereof I have signed this specification in the presence of two subscribing witnesses.

GEORGE W. JOHNSON.

Witnesses:
L. S. LAWHORN,
F. B. SEALE.